United States Patent [19]
Cretekos et al.

[11] Patent Number: 6,074,762
[45] Date of Patent: Jun. 13, 2000

[54] BLOCK RESISTANT FILM

[75] Inventors: George Forman Cretekos, Farmington; Lucy Dang, Fairport; John Ralph Wagner, Jr., Rochester, all of N.Y.

[73] Assignee: Mobil Oil Corporation, Fairfax, Va.

[21] Appl. No.: 09/026,454

[22] Filed: Feb. 19, 1998

[51] Int. Cl.[7] .................................................. B32B 27/32
[52] U.S. Cl. .......................................... 428/516; 428/451
[58] Field of Search .................................. 428/451, 515, 428/516

[56] References Cited

U.S. PATENT DOCUMENTS

| | | | |
|---|---|---|---|
| 4,614,677 | 9/1986 | Pennace et al. | 428/40 |
| 4,692,379 | 9/1987 | Keung et al. | 428/349 |
| 4,734,317 | 3/1988 | Bothe et al. | 428/215 |
| 4,818,576 | 4/1989 | Pennace et al. | 428/40 |
| 4,925,728 | 5/1990 | Crass et al. | 428/216 |
| 4,966,933 | 10/1990 | Kawakami et al. | 524/310 |
| 4,978,436 | 12/1990 | Kelly | 204/165 |
| 5,169,714 | 12/1992 | Kondo et al. | 428/331 |
| 5,169,900 | 12/1992 | Gudelis | 525/106 |
| 5,306,559 | 4/1994 | Christopherson | 428/349 |
| 5,425,996 | 6/1995 | Wilkie et al. | 428/461 |
| 5,466,734 | 11/1995 | Catena et al. | 524/230 |
| 5,482,780 | 1/1996 | Wilkie et al. | 428/515 |
| 5,489,473 | 2/1996 | Wilkie | 428/323 |
| 5,498,474 | 3/1996 | Schuhmann et al. | 428/323 |
| 5,616,400 | 4/1997 | Zhang | 428/195 |
| 5,658,661 | 8/1997 | Mitchell, Jr. et al. | 428/352 |
| 5,728,469 | 3/1998 | Mann et al. | 428/418 |
| 5,840,419 | 11/1998 | Alder | 428/327 |

FOREIGN PATENT DOCUMENTS 2668799  7/1997  Japan .

*Primary Examiner*—D. S. Nakarani
*Attorney, Agent, or Firm*—Lori F. Cuomo; Dennis P. Santini

[57] ABSTRACT

A block-resistant film is described which comprises a core layer of a thermoplastic polymer having a first side and a second side; a functional layer which is printable or sealable or treatable for printing or sealing is on the first side of the core layer, and a block-resistant layer is on the second side of the core layer. The block-resistant layer comprises a thermoplastic polymer and an amount of a polydialkylsiloxane, based upon the entire weight of the block-resistant layer, sufficient to inhibit blocking of the block-resistant layer to the functional layer when they are in contact and which polydialkylsiloxane deposits silicon onto the functional layer but the amount of silicon deposited is not substantially detrimental to the printing function or the sealing function.

11 Claims, No Drawings

BLOCK RESISTANT FILM

FIELD OF THE INVENTION

The invention relates to a block-resistant film. More precisely, the invention relates to a multilayer film having a core layer and a block-resistant layer which inhibits blocking to a functional layer of the film which is printable or sealable or treatable for sealing or printing.

BACKGROUND OF THE INVENTION

Blocking is the unwanted adhesion between layers of plastic film that may occur under pressure, usually during storage or use. It is known that blocking can be prevented with the use of antiblocking agents which are added to the composition which makes-up the surface layer of the film. Known antiblocking additives for plastic packaging film include synthetic waxes. In U.S. Pat. No. 4,692,379, various antiblocking agents for a heat sealable outer skin of a multilayer film are specifically described, including silica, clay, talc and glass.

Sealable coatings used on flexible packaging films so that the films can be sealed with the application of pressure and with or without out exposure to elevated temperatures can pose blocking problems. A typical cold seal coating is a natural or synthetic rubber latex which tends to be tacky at room temperature and causes blocking. The rubber component permits sealing with slight pressure and without using heat. The cold seal coating is usually applied to a plastic film as it is wound into a roll. Since the cold seal coatings are tacky, it is important that the backside of the film which contacts the cold seal coating upon winding does not stick (block) to the cold seal coating so that the film can be easily unwound for use on packaging equipment.

One approach for reduced blocking between the cold seal coating and the backside of the film has been to formulate a cold seal coating which is nonblocking to certain surfaces including polypropylene, such a cold seal formulation is described in U.S. Pat. No. 5,616,400.

Another approach uses a cold seal release material on the layer opposite the cold seal surface, see U.S. Pat. Nos. 5,482,780; 5,489,473 and 5,466,734.

In U.S. Pat. No. 4,692,379, a film is described which has an upper heat sealable layer formed from an ethylene-propylene-containing copolymer or terpolymer and an antiblocking agent, the lower heat sealable layer is formed from an ethylene-propylene-containing copolymer or terpolymer and antiblocking agent and a quantity of silicone oil such that the coefficient of friction-reducing amount of the silicone oil will be present on an exposed surface of the upper heat sealable layer following mutual contact of the upper and lower surfaces. The silicone oil additive is described as having a viscosity of from about 350 to about 100,000 centistokes with about 10,000 to about 30,000 centistokes being preferred. An advantage of the invention as described in the '379 patent is that the silicone is present on the exposed surface of the lower layer in discrete microglobules which, to some extent, transfer to the upper surface upon contact. The silicone on the surfaces of the film facilitates machinability.

An attempt was made to produce a block-resistant functional film, typically a film having a printing function or sealing function, with silicone oil in a surface layer as an antiblocking agent. It was found that the silicone oil was detrimental to the printing or sealing function.

SUMMARY OF THE INVENTION

The invention is directed to a block-resistant film, comprising:

(a) a core layer of a thermoplastic polymer, the core layer having a first side and a second side, (b) a functional layer which is printable or sealable or treatable for printing or sealing on the first side of the core layer, and (c) a block-resistant layer on the second side of the core layer comprising a thermoplastic polymer and an amount of a polydialkylsiloxane, based upon the entire weight of the block-resistant layer, sufficient to inhibit blocking of the block-resistant layer to the functional layer when they are in contact and which polydialkylsiloxane deposits silicon onto the functional layer but the amount of silicon deposited is not substantially detrimental to the printing function or the sealing function.

With this invention, as determined by Electron Microscopy for Chemical Analysis there is silicon, which is from polydialkylsiloxane, on the functional layer after the block-resistant layer contacts the functional layer but the amount deposited on the functional layer is not substantially detrimental to the printing function or the sealing function. Thus, the advantage of this invention is that with the polydialkylsiloxane of this invention, unlike the silicone oil described in U.S. Pat. No. 4,692,379, one can inhibit blocking but not substantially inhibit the printing or sealing function of the film.

The amount of the polydialkylsiloxane found to be sufficient to inhibit blocking of the block-resistant layer to the functional layer typically ranges from about 0.05 to about 10, specifically from about 0.1 to about 1, weight percent based on the entire weight of the block-resistant layer.

It is an object of the invention to produce a film having a functional layer which is printable or sealable or treatable for printing or sealing and reduce blocking of the functional layer to an outer layer on the opposite side of the film which happens when the film is wound into a roll or stacked so that the functional layer is in contact with the outer layer.

It is a feature of the invention to have a block-resistant layer which comprises a thermoplastic polymer and an amount of a polydialkylsiloxane sufficient to inhibit blocking of the block-resistant layer to the functional layer which happens when the film is wound into a roll or stacked so that the functional layer is in contact with the block-resistant layer.

It is another feature of the invention to have a block-resistant layer of the film which comprises a thermoplastic polymer and a polydialkylsiloxane which deposits silicon onto the functional layer but the amount deposited is not substantially detrimental to the printing function or the sealing function.

It is an advantage of the invention that when the film is wound into a roll or stacked for storage in such a manner that the functional layer is in contact with the block-resistant layer of the film, the block-resistant layer, made with the polydialkylsiloxane described herein, deposits less silicon onto the functional layer than the silicone oil described in U.S. Pat. No. 4,692,379 such that with the instant invention the printing or sealing function is not substantially impaired.

It was found that the block-resistant multilayer film of this invention requires a block force of less than or equal to about 35 g/25 mm to separate the functional layer from the block-resistant layer when the layers are in contact for about seventy-two hours at about 690 kPa and at a temperature of about 20° C.

DETAILED DESCRIPTION OF THE INVENTION

The block-resistant film of the instant invention is resistant to the undesirable adhesion between an exposed surface of the first side of the film to an exposed surface of a second side of the film which adhesion develops under pressure, typically, during storage or use.

The block-resistant layer of the instant invention is made with a particular polydialkylsiloxane additive. The polydialkylsiloxane additive is especially selected because it inhibits blocking and does not, in an amount detrimental to the functional properties of the film, appear on the surface of the block-resistant layer or the functional layer. The appearance of the polydialkysiloxane is determined by measuring the amount of silicon on the film surface by Electron Spectroscopy for Chemical Analysis (ESCA). It has been found that when a functional layer which is printable or sealable or treated for printing or sealing, contacts a layer which is compounded with a polydialkylsiloxane, of the kind described in U.S. Pat. No. 4,692,379, that polydialkylsiloxane (silicon oil) appears on the surface of both the functional layer and the block-resistant layer, after contact of the functional layer to the block-resistant layer (by measuring the amount of silicon), to an extent which is considered detrimental to the printability or sealability of the functional layer.

The core layer comprises a film-forming thermoplastic polymer which has properties suitable for extrusion or coextrusion followed by biaxial orientation in the machine and transverse directions under elevated temperature so as to form a film. Although, preferably, the thermoplastic polymer of the core layer is a propylene homopolymer, it can be any polymer made from a 2 to 4 carbon atom olefin, such as ethylene or butene-1 or a polymer made predominantly of propylene with a minor amounts of another olefin, usually a 2 to 4 carbon atom olefin.

The layer which is block-resistant and the functional layer may be the same or different. The block-resistant layer and the functional layer comprise a film-forming polymer having properties suitable for extrusion and uniaxial or biaxial orientation (by stretching the extrudate in the machine direction and/or transverse direction under elevated temperatures) and for forming skin layers on the outer surfaces of the core layer. Such layers comprise a thermoplastic polymer composed predominantly of an olefinic polymer such as polypropylene or polyethylene.

The block-resistant layer is, typically, comprised of a predominant proportion of propylene or ethylene and may contain a minor amount of another olefinic monomer having 2 to 8 carbon atoms. Typically the block resistant layer comprises a propylene homopolymer, ethylene homopolymer, copolymer of ethylene and propylene or a terpolymer of ethylene, propylene and butene-1.

The thermoplastic polymer of the functional layer may be the same as the thermoplastic polymer of the block-resistant layer or it may be copolymer or terpolymer of ethylene, propylene and butylene or another olefin having 5 to 10 carbon atoms or a mixture of these olefin polymers. Usually, when it is desirable for this layer to be printable or sealable or treatable for printing or sealing, it is comprised of an ethylene homopolymer having a density of about 0.91 to about 0.96 g/cm$^3$, ethylene-propylene copolymer in which the ethylene content is about 2 to 10% by weight based upon the total weight of the copolymer or an ethylene-propylene-butene-1 terpolymer in which the ethylene content is about 0.5 to about 7 weight % ethylene and about 5 to about 30 weight % butylene, each based upon the total weight of the terpolymer.

The block-resistant layer is compounded with an amount of a polydialkylsiloxane sufficient to inhibit blocking of the block-resistant layer to the functional layer when the layers are in contact so that the layers can be easily separated. Such blocking characteristics are beneficial in high speed machinery, e.g. packaging machinery and printing machinery. Although through analysis by electron spectroscopy it is known that silicon from the polydialkylsiloxane is present on the surface of both the block-resistant layer and the functional layer, the amount is not substantially detrimental to the printing function or sealing function of the film. For example, on winding the film into a roll for storage so that the external surface of the block-resistant layer contacts the external surface of the functional layer, the polydialkylsiloxane incorporated into the block-resistant layer has less tendency to transfer to the functional layer than the silicone oil described in U.S. Pat. No. 4,692,379. This was determined by measuring the silicon present on the surfaces of the block-resistant layer and the functional layer by electron spectroscopy after the roll was unwound.

The polydialkylsiloxane of this invention can be more particularly defined as a polydialkylsiloxane selected from the group consisting of (1) a polydialkylsiloxane having a number average molecular weight above about 200,000, generally above about 250,000, typically above about 300,000 and a viscosity of above about 10,000,000 cSt, usually ranging from about 15,000,000 to about 20,000,000 cSt, or (2) a polydialkylsiloxane functionalized polyolefin.

The alkyl group of the polydialkylsiloxane usually ranges from 1 to about 10 carbon atoms, more usually from 1 to about 3 carbon atoms, which carbon atoms can be in a straight or branched chain configuration.

When the polydialkylsiloxane is (2), a polydialkylsiloxane functionalized polyolefin, the polyolefin usually contains about 2 to about 4 carbon atoms which are usually in the form of a homopolymer. Typically, the polydialkylsiloxane is grafted onto a polypropylene backbone. A particularly useful polyolefin is polyethylene or polypropylene, although a copolymer, such as ethylene-propylene copolymer or ethylene-propylene-butene-1 terpolymer might be useful. A commercially available polydialkylsiloxane functionalized polyolefin which is useful in the films of this invention is available from DuPont under the trademark "Bynel" 2045-174-01.

The block-resistant layer can be of the kind described in U.S. Pat. Nos. 4,978,436 and 5,169,900 which are directed to a polyolefin film formed from polyolefin, dimethyl polysiloxane having functional end groups, vinyl silane, an agent to graft the vinyl silane onto the polyolefin and a moisture curing agent. For a description of such a block-resistant layer, the entire disclosure of U.S. Pat. No. 4,978,436 is incorporated herein by reference in its entirety.

One particular kind of polydialkylsiloxane used in this invention is referred to as "silicone gum", also described as an "ultra high molecular weight silicone". Silicone gum can be in the form of a silicone polymer dispersed in polypropylene. Silicone gum of this kind is available in a masterbatch form from the Dow Corning Corporation, of Midland Mich., under the product designation "MB 50-001".

The ratio of polydialkylsiloxane to polyolefin in the block-resistant layer is, typically very low, and is only sufficient to inhibit blocking of the block-resistant layer to the functional layer when the layers are in contact as would happen when the film is wound into a roll. While the ratio of the polydialkylsiloxane to the polyolefin will vary, typically, depending upon the nature of the polydialkylsiloxane and the nature of the olefinic component, the polydialkylsiloxane content ranges from about 0.05 to about 10 weight percent, specifically about 0.1 to about 1 weight percent based on the total weight of the block-resistant layer.

The functional layer includes those thermoplastic polymer skin layers suitable for being treated for printing or sealing or by being a thermoplastic polymer which is printable or sealable without treatment. In this regard, the functional layer may be selected from the group consisting of ethylene or propylene homopolymer, ethylene-propylene copolymer or ethylene-propylene terpolymer or a mixture of two or more of such homopolymer, copolymer or terpolymer. In one embodiment of the invention, the surface of the functional layer is treated by surface treatment which improves wettability and adhesion of printed matter (print may be by lithography, liquid or dry toner, thermal dye, dye sublimation, etc.). In another embodiment of the invention, the functional layer is a cold seal adhesion promoting layer.

It is contemplated that the block-inhibiting layer will provide excellent antiblocking properties to any commercially applied cold seal receptive composition or print receptive surface.

The functional layer may itself be printable or sealable or may be treated so as to provide sealability and/or printability. This includes surface treatment of any kind known to enhance the surface tension properties such as flame or corona treatment. Other treatment methods include the application of a printable or sealable covering layer by any means including conventional extrusion or coating. Certain water based coatings are known for their utility as cold-sealable coatings or printable coatings. Examples include acrylic-based coatings including alkyl acrylate polymers and copolymers.

Sometimes it is useful to enhance film properties or provide the film with certain properties by use of appropriate film additives. Such additives are used in effective amounts, which vary depending upon the property required, and are, typically selected from the group consisting of: antiblock, slip additive, antioxidant additive, moisture barrier additive or gas barrier additive.

Useful antistatic additives which can be used in amounts ranging from about 0.05 to about 3 weight %, based upon the weight of the layer, include alkali metal sulfonates, polyether-modified polydiorganosiloxanes, polyalkylphenylsiloxanes and tertiary amines.

Useful antiblock additives used in amounts ranging from about 0.1 weight % to about 3 weight % based upon the entire weight of the layer include inorganic particulates such as silicon dioxide, e.g. a particulate antiblock sold by W. R. Grace under the trademark "Sipernat 44", calcium carbonate, magnesium silicate, aluminum silicate, calcium phosphate, and the like, e.g., Kaopolite. Another useful particulate antiblock agent is referred to as a non-meltable crosslinked silicone resin powder sold under the trademark "Tospearl" made by Toshiba Silicone Co., Ltd. and is described in U.S. Pat. No. 4,769,418. Another useful antiblock additive is a spherical particle made from methyl methacrylate resin having an average diameter of 1 to 15 microns, such an additive is sold under the trademark "Epostar" and is commercially available from Nippon Shokubai. Experimental results show that with addition of particulate antiblock additives such as Epostar MA1010, T145, Kaopolite 1152, Sipernat 44 do not materially effect antiblock properties of the block-resistant layer formulated in accordance with this invention but do reduce the coefficient of friction properties of the film.

Typical slip additives include higher aliphatic acid amides, higher aliphatic acid esters, waxes and metal soaps which can be used in amounts ranging from about 0.1 to about 2 weight percent based on the total weight of the layer. A specific example of a useful fatty amide slip additive is erucamide.

Useful antioxidants are, generally used in amounts ranging from about 0.1 weight % to about 2 weight percent, based on the total weight of the layer, phenolic antioxidants. One useful antioxidant is commercially available under the trademark "Irganox 1010".

Barrier additives are used in useful amounts and may include low-molecular weight resins, hydrocarbon resins, particularly petroleum resins, styrene resins, cyclopentadiene resins and terpene resins.

Optionally, the outer layers are compounded with a wax for lubricity. Amounts of wax range from about 2 to about 15 weight % based on the total weight of the layer.

The process of making the block-resistant layer can be by masterbatch in which a minor proportion of a concentrated composition of polydialkylsiloxane and the thermoplastic polymer, along with any optional additives is prepared and mixed (usually by dry mixing) into a major proportion of a thermoplastic polymer. The amount of concentrate in the masterbatch usually ranges from about 5% by weight to about 50% by weight based on the total weight of the block resistant layer. The mixture is then melt mixed in an extruder or compounded in a twin screw extruder. Alternatively, the block resistant layer is prepared in one step by mixing the thermoplastic polymer, polydialkylsiloxane and, optionally, by any additives in the proportions used for making up the final skin composition.

Typically, the film is formed by coextruding the thermoplastic polymer core layer together with the block-inhibiting layer and functional layer through a flat sheet extruder die at a temperature ranging from between about 200 to about 250° C., casting the film onto a cooling drum and quenching the film. The sheet is then stretched about 3 to about 7 times in the machine direction (MD) orienter followed by stretching about 5 to about 10 times in the transverse direction (TD) orienter. The film is then wound onto a reel. Optionally, one or both of the external surfaces are coated and/or flame treated or corona treated before winding. When the exposed surface of the block-inhibiting layer comes into contact with the exposed surface of the functional layer, it is a surprising advantage that the polydialkylsiloxane described herein does not transfer to the functional layer in a manner which substantially inhibits the functionality of the functional layer. That is, the polydialkylsiloxane transfers to an insubstantial degree, at least as determined from the silicon content by ESCA. An amount detrimental to the functional properties of the film would be that amount which would interfere with adhesion of print to the film, sealability of the sealable surface or the adhesion of a sealable coating or the adhesion of a printable coating. The relative amount of silicon which is likely to be found on the functional layer as determined by ESCA was less than about 1, typically about 0.001 to about 0.5. The term "relative amount" means that atomic percentage of silicon, relative to the total atomic percentage of silicon in the antiblock layer, which will be found on the surface of the functional layer.

In general, the film of the instant invention comprises at least three layers: the core layer and the block-resistant layer (usually the outermost skin layer) and the layer which is functional (also usually the outermost skin later). It is contemplated that additional layers can be incorporated between the core layer and the outermost skin layers, e.g., tie layers comprising polypropylene or polyethylene. The core layer usually represents about 70 to about 90 percent of the thickness of the total film. The skin layers are usually coextensively applied to each major surface of the core layer, typically by coextrusion, as noted above. The block-resistant layer or the functional layer may not, ultimately, be the outermost layers.

INVENTION EXAMPLES AND COMPARATIVE EXAMPLE

In each of the examples, the antiblock performance of the described film samples was tested by placing the block-resistant surface against a cold seal surface coating (Technical Coatings product "30061A") for seventy-two hours at 100 psi (689.5 kPa) and room temperature, about 72° F. (22° C.). The block force reported below was measured by peeling the layers apart in an Instron brand tester which reported the peel force in grams per inch (g/25 mm).

Cold seal bond strength was determined by pattern coating a cold seal coating (Technical Coatings product "30061A") then forming a crimp seal by contacting the sealable surfaces (0.75 seconds, 20 psi (137.0 kPa)) together and pulling the seal apart in an Instron type test machine which measures the force needed to separate the seal.

Examples 1 and 2

A coextruded biaxially oriented three layer film was made having a core layer, of about 18.8 microns thickness, of polypropylene (commercially available from Fina under the product designation "3371") with upper and lower skin layers. The upper layer was about 0.6 microns in thickness and was made from a polypropylene resin (Fina 3371) twin screw compounded with 5% (Example 1) and 10% (Example 2) of a silicone modified polypropylene sold by DuPont under the trademark "Bynel" 2045-174-01 and 2000 ppm of a non-meltable crosslinked silicone resin powder "Tospearl 145" sold by Toshiba Silicone Company, Ltd. The Tospearl 145 silicone resin powder was for control of coefficient of friction properties. The lower layer was a high density polyethylene (Lyondell 6030) of about 0.6 microns thickness. The lower layer was flame treated to a level of 40–50 dynes, the upper layer was untreated. The films were wound into a roll and the samples were tested for blocking to a cold sealable coating.

For the film of Example 1, the crimp seal bond strength was initially 238 g/25 mm, after 2 weeks 465 g/25 mm, and after 4 weeks 411 g/25 mm.

For the film of Example 2, the crimp seal bond strength was initially 272 g/25 mm, after 2 weeks 446 g/25 mm and after 4 weeks 417 g/25 mm.

Examples 3 and 4

These examples were the same as Examples 1 and 2 except they demonstrate the masterbatch method and the polydialkylsiloxane of the upper layer material was an ultra high molecular weight silicone (commercially available from Dow Corning under the product designation "MB50-001") compounded into polypropylene (Fina 3371) which was subsequently compounded into polypropylene at 3000 ppm (Example 3) and 6000 ppm (Example 4). A non-meltable crosslinked silicone resin powder "Tospearl T120" (commercially available from Toshiba Silicone Company, Ltd.) was added to the upper layers in an amount of 1000 ppm (for coefficient of friction control). The films were wound into a roll and the samples were tested for blocking to a cold sealable coating.

An example of a film similar to the film of this Example 3 (only made in a different location) performed very well in a print adhesion test. To the printed side of the film, a commercially available tape from 3M (Scotch brand 610 tape) was applied and peeled off quickly. A visual inspection of the tape and film showed no ink-pick-off.

Comparison Examples 5–7

In these examples, a polydialkylsiloxane of this invention was not used. These examples were substantially the same as Example 1 with the following exceptions.

In Example 5, the upper layer was a twin screw compounded composition of 1000 ppm non-meltable crosslinked silicone resin powder "Tospearl 145" sold by Toshiba Silicone Company, Ltd. and polypropylene (Fina 3371).

In Example 6, the upper layer was a twin screw compounded composition of 500 ppm methyl methacrylate resin particles "Epostar MA1010" commercially available from Nippon Shokubai, 2000 ppm clay particles (commercially available Kaopolite 1152) and 2000 ppm silica (commercially available from WR Grace, "Sipernat 44") and polypropylene (Fina 3371).

In Example 7, the upper layer was a twin screw compounded composition of 500 ppm erucamide and polypropylene (Fina 3371) and the core layer was 500 ppm erucamide and polypropylene (Fina 3371). The crimp seal bond strength initially was 333 g/25 mm, after 2 weeks 495 g/25 mm and after 4 weeks 374 g/25 mm.

Comparison Example 8

In this example, the upper layer was an untreated terpolymer skin resin (commercially available from Chisso under the product designation 7502) and 12,000 ppm of a 30,000 centistoke silicone oil and 2300 of silica antiblock (commercially available from WR Grace under the product designation "Sylobloc 44"). The core layer was polypropylene and the lower layer was a high density polypropylene. This film product is commercially available from Mobil Chemical Company under the product designation "SPW-L".

TABLE 1

| Example No. | Blocking, g/in (g/25 mm) | % Si Upper/Lower layers |
| --- | --- | --- |
| 1 | 26.5 | 0.74/0.50 |
| 2 | 27.2 | 0.24/0.28** |
| 3 | 32.1 | 0.13/* |
| 4 | 31.3 | 0.10/* |
| 5 | 62.3 | 0/* |
| 6 | 51.6 | 0/* |
| 7 | 27.7 | 0/0 |
| 8 | * | 6.48/5.30 |

*not measured
**0.28 was an average of three values:
0.05, 0.18 and 0.62, 0.62 was abnormally high and might have been so because of sample contamination.

The results of Table 1 show the low block force when a film has the block resistant layer of the instant invention. The data of Table 1 also show that the addition of a the non-meltable crosslinked silicone resin powder ("Tospearl") did not significantly reduce block force, compare Examples 1 and 2 of this invention with Example 5 which only contained the non-meltable crosslinked silicone resin powder ("Tospearl"). Example 8 shows that silicone oil of the kind described in U.S. Pat. No. 4,692,379 resulted in a film having a high silicon content on the upper and lower surface layers, as determined by ESCA. The films of Examples 1 to 4 had a very low silicon content on the upper surface layer which would not be detrimental to the printing function or the sealing function of the film upon contact of the upper surface layer with the lower surface layer. As shown in Examples 1 and 2 the polydialkylsiloxane was not detrimental to cold seal bond strengths and as shown in Example 3, the polydialkylsiloxane was not detrimental to the printability of the film.

In Example 7 erucamide was used. Erucamide is commonly used in release films (non-blocking). However, erucamide is known to be detrimental to cold sealability and is inconsistent in its antiblock function.

What is claimed is:

1. A block-resistant film, comprising:
   (a) a core layer of a thermoplastic polymer, the core layer having a first side and a second side,
   (b) a functional layer consisting essentially of a thermoplastic polymer which is printable or sealable or treatable for printing or sealing on the first side of the core layer, and
   (c) a block-resistant layer on the second side of the core layer comprising a thermoplastic polymer and an amount of a polydialkylsiloxane having a number average molecular weight greater than about 200,000, based upon the entire weight of the block-resistant layer, sufficient to inhibit blocking of the block-resistant layer to the functional layer when they are in contact and which polydialkylsiloxane deposits silicon onto the functional layer but the amount deposited is not substantially detrimental to the printing function or the sealing function.

2. The block-resistant film as claimed in claim 1 in which the thermoplastic polymer of the core layer is a propylene polymer.

3. The block-resistant film as claimed in claim 1 in which the amount of the polydialkylsiloxane ranges from about 0.05 to about 10 weight percent based on the entire weight of the block-resistant layer.

4. The block-resistant film as claimed in claim 1 in which the amount of the polydialkylsiloxane ranges from about 0.1 to about 1 weight percent based on the entire weight of the block resistant layer.

5. The block-resistant film as claimed in claim 1 in which the polydialkylsiloxane has a number average molecular weight greater than about 250,000.

6. The block-resistant film as claimed in claim 1 in which the polydialkylsiloxane has a viscosity above about 10,000,000 centistokes.

7. The block-resistant film as claimed in claim 1 in which the polydialkylsiloxane is a polydialkylsiloxane grafted polyolefin.

8. The block-resistant film as claimed in claim 1 in which the block resistant layer is polypropylene or polyethylene and the functional layer is polypropylene or polyethylene, or ethylene-propylene copolymer or ethylene-propylene-butene-1 terpolymer or a mixture of two or more of the foregoing homopolymer, copolymer or terpolymer.

9. The block-resistant film as claimed in claim 1 in which the amount of silicon transferred to the functional layer is less than 1 times the amount of silicon on the surface of the block resistant layer, as determined by Electron Spectroscopy for Chemical Analysis.

10. A block-resistant multilayer film having a functional layer which is printable or sealable or which can be made printable or sealable and a block-resistant layer comprising a polyolefin and an amount of (a) a polydialkylsiloxane having a number average molecular weight greater than about 200,000, or (b) a polydialkylsiloxane grafted polyolefin sufficient to require a block force of less than or equal to about 35 g/25 mm to separate the functional layer from the block-resistant layer after the layers are in contact for about seventy-two hours at about 690 kPa and at a temperature of about 21° C.

11. A block-resistant film, comprising:
   (a) a core layer of a thermoplastic polymer, the core layer having a first side and a second side,
   (b) a functional layer consisting essentially of a thermoplastic polymer which is printable or sealable or treatable for printing or sealing on the first side of the core layer, and
   (c) a block-resistant layer on the second side of the core layer comprising a thermoplastic polymer and an amount of a polydialkylsiloxane grafted polyolefin, based upon the entire weight of the block-resistant layer, sufficient to inhibit blocking of the block-resistant layer to the functional layer when they are in contact and which polydialkylsiloxane deposits silicon onto the functional layer but the amount deposited is not substantially detrimental to the printing function or the sealing function.

* * * * *